United States Patent [19]

Moden

[11] Patent Number: 4,495,256

[45] Date of Patent: Jan. 22, 1985

[54] DUAL ELECTROCHEMICAL SYSTEM

[75] Inventor: James R. Moden, Bristol, R.I.

[73] Assignee: The United States of America as represented by the Secretary of the Navy, Washington, D.C.

[21] Appl. No.: 573,904

[22] Filed: Jan. 26, 1984

[51] Int. Cl.³ .............................................. H01M 8/04
[52] U.S. Cl. ........................................ 429/17; 429/19
[58] Field of Search ...................... 429/17, 19, 13, 14, 429/34, 46, 26, 72, 80, 120

[56] References Cited

U.S. PATENT DOCUMENTS

| | | | |
|---|---|---|---|
| 3,758,339 | 9/1973 | Manion | 429/46 X |
| 3,839,091 | 10/1974 | Bloomfield et al. | 429/46 X |
| 4,081,693 | 3/1978 | Stone | 429/26 X |
| 4,087,976 | 5/1978 | Morrow, Jr. et al. | 429/17 X |

Primary Examiner—Anthony Skapars
Attorney, Agent, or Firm—Robert F. Beers; Arthur A. McGill; Prithvi C. Lall

[57] ABSTRACT

This invention provides a means to increase the energy density of two electrochemical systems by using the by-product of each system as one of the necessary ingredients of the reactants of the other system. For example:

(a) $2Li + H_2O_2 \rightarrow 2LiOH$ (b) $2LiOH + 3H_2O_2 + 2Al \rightarrow 2LiAlO_2 \downarrow + 4H_2O$ where the LiOH from (a) is used in (b) and the $H_2O$ from (b) is used to fulfill the dilution requirements of (a).

4 Claims, 1 Drawing Figure

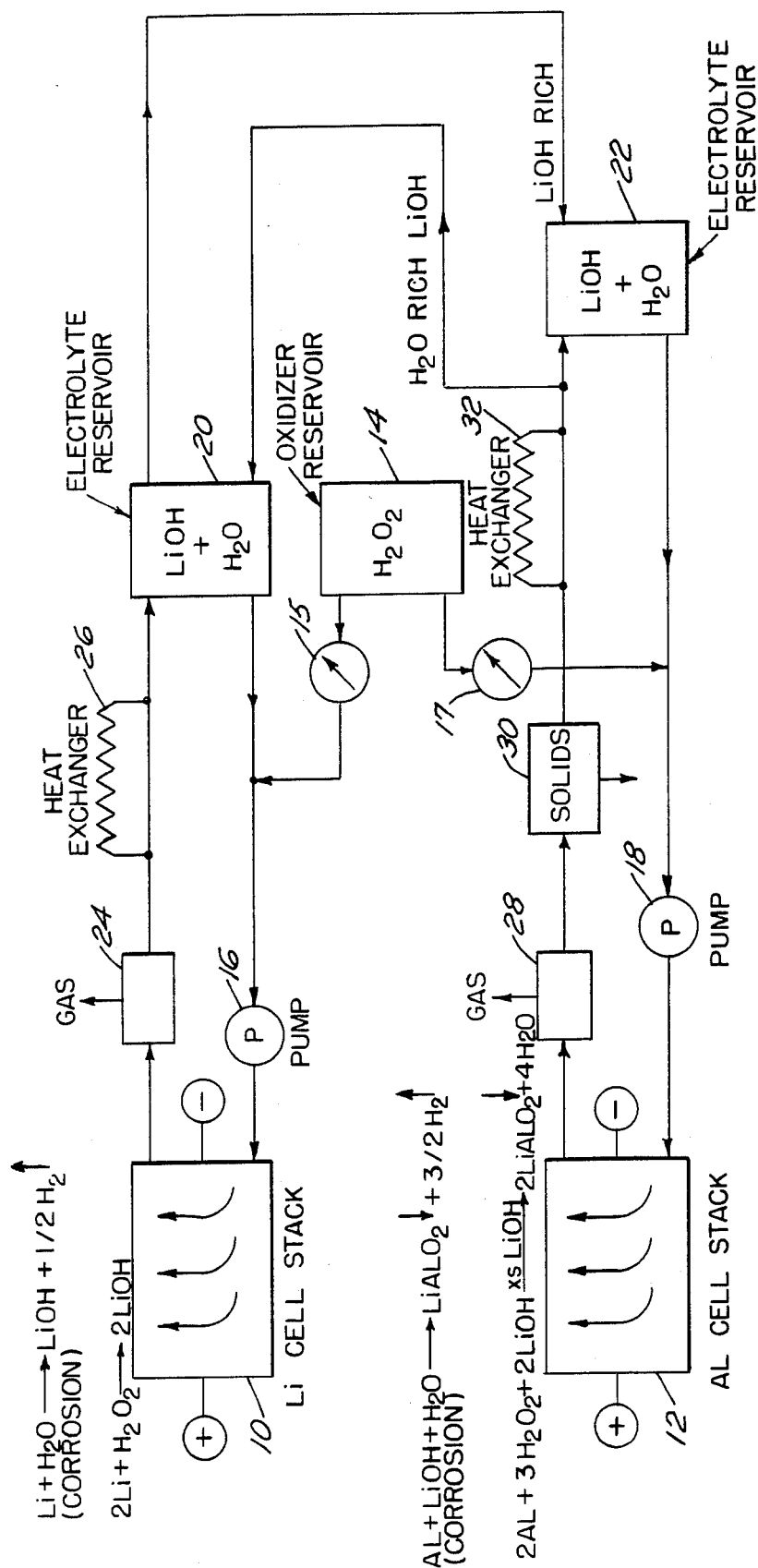

DUAL ELECTROCHEMICAL SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

Each of two electrochemical systems has its energy density increased by using the by-product of the other system as one of the necessary ingredients of the reactants. In this way ingredients that would otherwise constitute a burden on one or the other system if used separately, thus reducing the overall energy density, instead contribute to the conversion of energy by increasing the overall energy density.

(2) Description of the Prior Art

It has been determined that an electrochemical energy source based on the overall reaction, $2Li + H_2O_2 \rightarrow 2LiOH$, could on a systems basis compete favorably with a thermal energy source for such applications as helicopter propulsion. One of the major systems problems in the development of an electrochemical energy source system is the reaction shown above is self-limiting unless the excess LiOH is either eliminated from the reaction site or is diluted with water to a usable concentration. Prior art techniques for the elimination of the LiOH or its dilution require the use of space and weight allowances which, as penalties to the system, effectively reduce its overall volumetric and gravimetric energy density.

SUMMARY OF THE INVENTION

The present invention provides a way to use the excess LiOH formed in the above reaction to produce more energy and at the same time produce by-products which allow the relatively easy removal of the lithium compound while producing sufficient water to perform the necessary dilution of some of the LiOH and the $H_2O_2$. An example of the proposed reactions constitute two electrochemical systems working in tandem as follows:

(a) $2Li + H_2O_2 \longrightarrow 2LiOH$

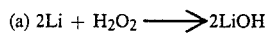

(b) $2LiOH + 3H_2O_2 + 2Al \xrightarrow{xsLiOH} 2LiAlO_2 \downarrow + 4H_2O$

Thus the LiOH produced in (a) is used in this invention as an electrolyte constituent and as a reactant in (b), another electrical energy producing reaction that produces a separable precipitate $LiAlO_2$ and in addition has a by-product of water. The water provides the necessary dilution to allow the productive use of LiOH as an electrolyte constituent in each of the reactions. This mitigates the use of non-productive devices to eliminate the LiOH formed in reaction (a) or the carrying of excess water for its dilution.

BRIEF DESCRIPTION OF THE DRAWING

The FIGURE is a schematic representation of the dual electrochemical system of the present invention.

DESCRIPTION OF THE PREFERRED EMBODIMENT

Referring now to the FIGURE there is shown the operation of the present system in schematic form. A lithium cell stack 10 is comprised of an anode of bipolar plates of lithium, a metallic intercell connector and a cathode comprised of a carbon graphite with or without catalyst. An aluminum cell stack 12 is comprised of an anode of bipolar plates of aluminum, a metallic intercell connector and a cathode comprised of a carbon graphite with or without catalyst. A reservoir 14 contains a quantity of hydrogen peroxide. Reservoir 14 is connected to both cell stacks 10 and 12 by means of conduits through respective metering valves 15 and 17, and pumps 16 and 18. A first electrolyte reservoir 20 of lithium hydroxide and water has its contents mix with the hydrogen peroxide from reservoir 14 and pass through pump 16 to lithium cell stack 10. A second electrolyte reservoir 22 of lithium hydroxide and water has its contents mix with the hydrogen peroxide from the same reservoir 14 and pass through pump 18 to the aluminum cell stack 12. A line from the lithium cell stack 10 connects to a gas vent 24 whose purpose is to vent collected gases in a first loop of the system to the ambient. The gas vent 24 is then connected through a line to a heat exchanger 26 for removal of excess heat. Conduits then extend from heat exchanger 26 to reservoir 20 and to reservoir 22. A line from aluminum cell stack 12 connects to a gas vent 28 whose purpose is to vent collected gases in a second loop of the system to the ambient. The gas vent then connects to a solid disposal device 30 for the elimination of solid wastes. A line then connects to a heat exchanger 32 for the elimination of excess heat. Conduits then connect from heat exchanger 32 to both reservoir 22 and to the first loop for conveying water rich lithium hydroxide.

The reactions involved in the first loop at lithium cell stack 10 can be expressed by the following equation:

$$2Li + H_2O_2 \longrightarrow 2LiOH \quad \text{(eq. 1)}$$

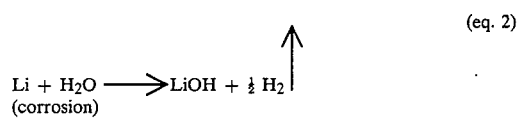

$$Li + H_2O \longrightarrow LiOH + \tfrac{1}{2} H_2 \uparrow \quad \text{(eq. 2)}$$
(corrosion)

The reactions involved in the second loop at aluminum cell stack 12 are:

$$2LiOH + 3H_2O_2 + 2Al \xrightarrow{xsLiOH} 2LiAlO_2 \downarrow + 4H_2O \quad \text{(eq. 3)}$$

$$Al + LiOH + H_2O \longrightarrow LiAlO_2 \downarrow + 3/2 H_2 \uparrow \quad \text{(eq. 4)}$$
(corrosion)

In the operation of the first loop, lithium hydroxide and water are conducted to lithium cell stack 10 from reservoir 20 through pump 16, and hydrogen peroxide is conducted from reservoir 14 to lithium cell stack 10 through pump 16. The reactions of (eq. 1) and (eq. 2) are performed in lithium cell stack 10. The $H_2$ gas formed in (eq. 2) is then vented at gas vent 24. The excess heat appearing in the lithium hydroxide of (eq. 1) is removed by heat exchanger 26. The lithium hydroxide formed in both (eqs. 1 and 2) is then provided to both electrolyte reservoirs 20 and 22.

In the second operation of the loop, lithium hydroxide and water are conducted to aluminum cell stack 12 through pump 18, and hydrogen peroxide is conducted from reservoir 14 to aluminum cell stack 12 through pump 18. The reactions of (eq. 3) and (eq. 4) are performed in aluminum cell stack 12. The $H_2$ gas formed in (eq. 4) is then vented at gas vent 24. The $LiAlO_2$ precipitate formed in (eqs. 3 and 4) is removed at solid disposal device 30. The excess heat is removed by heat exchanger 32. The water formed in (eqs. 3 and 4) is then provided to both electrolyte reservoirs 20 and 22.

There has therefore been described a means of improving the volumetric and gravimetric energy density in electrochemical systems. A new feature is the use of two interdependent electrochemical reactions as a single energy source and the uniqueness of the electrochemistry of equation (3).

An alternative method may be the use of an alloy of lithium and aluminum so as to allow the two electrochemical reactions to take place simultaneously in one fuel cell or battery.

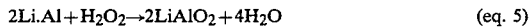

$$2Li.Al + H_2O_2 \rightarrow 2LiAlO_2 + 4H_2O \qquad (eq. 5)$$

It will be understood that various changes in details, materials, steps and arrangement of parts, which have been herein described and illustrated in order to explain the nature of the invention, may be made by those skilled in the art within the principle and scope of the invention as expressed in the appended claims.

What is claimed is:

1. A method of increasing the energy density of two electrochemical systems by using the by-product of each system as one of the necessary ingredients of the reactants of the other system comprising the steps of:
   providing a first reservoir having hydrogen peroxide therein;
   providing at least one other reservoir having a lithium hydroxide electrolyte therein;
   controllably adding hydrogen peroxide from said first reservoir and lithium hydroxide electrolyte from said other reservoir to a lithium cell stack for providing a electrochemical reactor that includes the formation of lithium hydroxide;
   returning said formed lithium hydroxide to said other reservoir;
   controllably adding hydrogen peroxide from said first reservoir and lithium electrolyte from said other reservoir to an aluminum cell stack for providing a electrochemical reaction that includes the formation of lithium aluminate and water; and
   returning said formed water to said other reservoir.

2. A system for increasing the energy density of two electrochemical systems comprising:
   a lithium cell stack;
   an aluminum cell stack;
   a first reservoir containing hydrogen peroxide therein;
   at least one other reservoir containing a lithium hydroxide electrolyte;
   first control means for feeding hydrogen peroxide from said first reservoir and lithium electrolyte from said other reservoir into said lithium cell stack for providing a first electrochemical reaction that forms lithium hydroxide;
   first return means for returning said lithium hydroxide to said other reservoir;
   second control means for feeding hydrogen peroxide from said first reservoir and lithium hydroxide electrolyte from said other reservoir into said aluminum cell stack for providing a second chemical reaction that forms lithium aluminate and water; and
   second return means for returning said water to said other reservoir.

3. A method of increasing the energy density of two electrochemical systems by using the by-product of each system as one of the necessary ingredients of the reactants of the other system comprising the steps of:
   providing a first reservoir having hydrogen peroxide therein;
   providing a second and a third reservoir with each of said second and third reservoirs having a lithium hydroxide electrolyte therein;
   controllably adding hydrogen peroxide from said first reservoir and lithium hydroxide electrolyte from said second reservoir to a lithium cell stack for providing a electrochemical reactor that includes the formation of lithium hydroxide;
   conducting said formed lithium hydroxide to said second and third reservoirs;
   controllably adding hydrogen peroxide from said first reservoir and lithium hydroxide electrolyte from said third reservoir to an aluminum cell stack for providing a electrochemical reaction that includes the formation of lithium aluminate and water; and
   conducting said formed water to said second and third reservoir.

4. A system for increasing the energy density of two electrochemical systems comprising:
   a lithium cell stack;
   an aluminum cell stack;
   a first reservoir containing hydrogen peroxide therein;
   second and third reservoirs with each containing a lithium hydroxide electrolyte;
   first control means for feeding hydrogen peroxide from said first reservoir and lithium hydroxide electrolyte from said second reservoir into said lithium cell stack for providing a first electrochemical reaction that forms a by-product of lithium hydroxide;
   first conducting means for conducting said lithium hydroxide to said second and third reservoir;
   second control means for feeding hydrogen peroxide from said first reservoir and lithium hydroxide electrolyte from said other reservoir into said aluminum cell stack for providing a second electrochemical reaction that forms as by-products lithium aluminate and water; and
   second conducting means for conducting said water to said second and third reservoir.

* * * * *